United States Patent [19]
Mizukawa

[11] 4,444,299

[45] Apr. 24, 1984

[54] AUTOMATIC CONTROL SYSTEM FOR OPERATING THE CLUTCH OF A CAR

[76] Inventor: Suehiro Mizukawa, 4-25, Nishi 5-chome, Torigai, Setsushi, Osaka, Japan

[21] Appl. No.: 307,936

[22] Filed: Oct. 2, 1981

[30] Foreign Application Priority Data

Oct. 8, 1980 [JP] Japan .................. 55-141499
Nov. 10, 1980 [JP] Japan .................. 55-158680

[51] Int. Cl.³ .............................................. B60K 41/28
[52] U.S. Cl. .............................. 192/0.055; 192/0.094
[58] Field of Search .............. 192/0.55, 0.033, 0.076, 192/0.094, 3 N

[56] References Cited

U.S. PATENT DOCUMENTS 2,983,346 5/1961 Weymann .................. 192/0.076

FOREIGN PATENT DOCUMENTS 968637 9/1964 United Kingdom ............ 192/0.055

Primary Examiner—George H. Krizmanich
Assistant Examiner—Mark Manley
Attorney, Agent, or Firm—Cushman, Darby & Cushman

[57] ABSTRACT

An automatic control system for operating the clutch of a car and capable of being attached to cars of manual shift transmission type comprising a servomotor mechanism forwardly and reversely rotated depending upon increase and decrease of supplied voltage to drive a clutch pedal in direction in which a clutch is connected and disconnected; a circuit for converting the rotation number of engine to a pulse output to detect the rotation number of engine; a frequency-voltage converter circuit for supplying to a servomotor an output voltage responsive to said pulse output; and a switching means connected on the way of a voltage supply line extending from the frequency-voltage converter circuit to the servomotor mechanism and changing voltage supplied to the servomotor mechanism by manual or foot operation to forwardly and reversely rotate the servomotor mechanism.

3 Claims, 4 Drawing Figures

AUTOMATIC CONTROL SYSTEM FOR OPERATING THE CLUTCH OF A CAR

BACKGROUND OF THE INVENTION

1. Field of the Invention

The present invention relates to an automatic control system for operating the clutch of a car and, more particularly, a new automatic control system capable of being easily attached to cars of manual shift transmission type so as to cause the operation of their clutches to be automatically controlled.

2. Description of the Prior Art

There are presently used two types of cars. One is a car having a manual shift transmission whose clutch pedal and shift lever are operated to change gears in the transmission and which will be hereinafter referred to as manual car. The other is a car having an automatic shift transmission whose accelerator is operated to increase or decrease the engine speed and to automatically change gears thus making it unnecessary to use the clutch pedal and shift lever and which will be hereinafter referred to as an automatic car.

Cars of these two types are quite different in construction from each other and it is considered impossible without large scale remodeling to convert automatic cars to manual cars or convert manual cars to automatic cars.

As is well known, automatic cars can be easily operated and are popular to women and old people. Therefore, most of cars tend to automatic cars these days.

The present invention is intended to meet this need and provide an automatic control system for operating the clutch of a car, which system being easily attached to manual cars to enable them to function as automatic cars.

SUMMARY OF THE INVENTION

It is therefore an object of the present invention to provide an automatic control system for operating the clutch of a manual car, so that the manual car will function as an automatic car simply by attaching the automatic control system thereto.

It is another object of the present invention to provide an automatic control system for operating the clutch of a car, in which the engine speed at which the clutch is to be connected can be optionally preset.

According to the present invention, there is provided an automatic control system for operating the clutch of a car comprising a servomotor mechanism which is rotated in a direction depending upon the increase or decrease of a supplied voltage to move a clutch pedal in directions in which a clutch is connected and disconnected. A circuit converts the speed of the engine to a pulse output. A frequency-voltage converter circuit supplies to the servomotor an output voltage responsive to this pulse output. And switching circuit is connected to a voltage supply line extending from the frequency-voltage converter circuit to the servomotor mechanism. By manual or foot operation, a voltage supplied to the servomotor mechanism can be changed with the switching circuit. Therefore, the clutch can be automatically connected and disconnected at the time of shifting speed change gears.

DETAILED DESCRIPTION OF THE PREFERRED EMBODIMENTS

The present invention will be now described in detail referring to the accompanying drawings.

Figure 1:
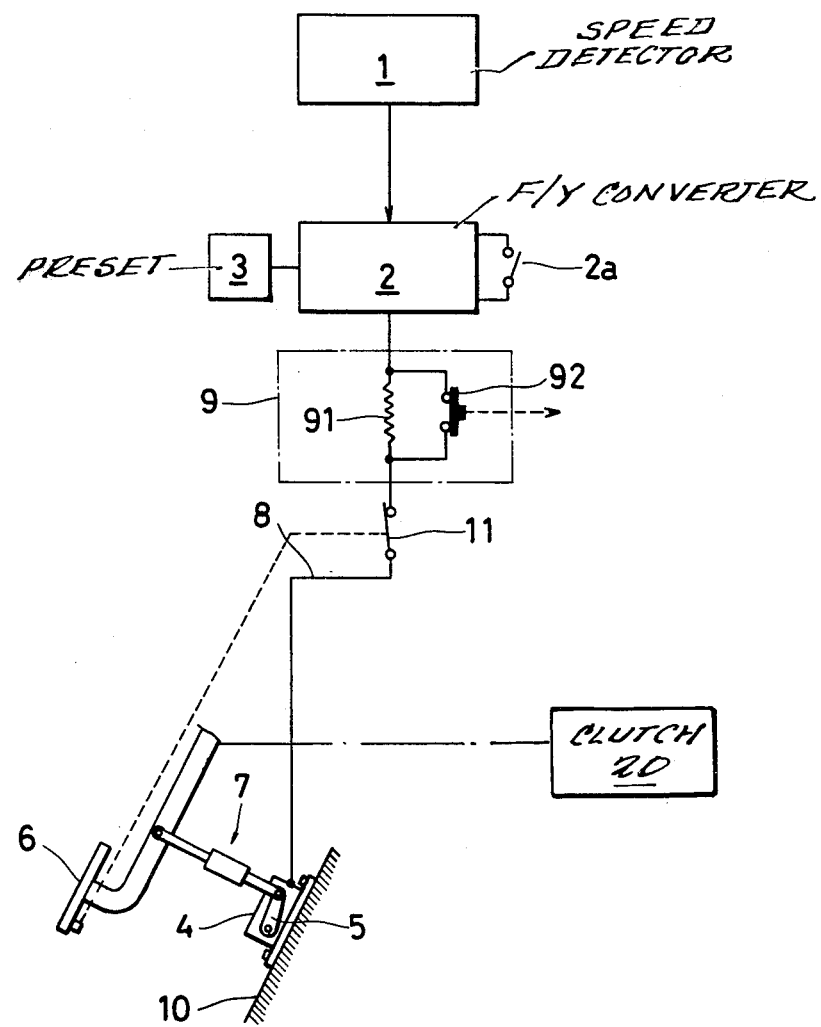
FIG. 1 schematically shows the basic construction of an embodiment according to the present invention.

FIG. 1 generally shows the basic construction of an embodiment according to the present invention. In FIG. 1, numeral 1 represents an engine speed detector circuit connected to an ignition means of an engine, said circuit serving to output pulses corresponding to the speed of the engine as detected rotation numbers of engine from ignition operations of engine. Numeral 2 denotes a frequency-voltage converter circuit to which output pulses are applied from the engine rotation detector circuit 1, said converter circuit serving to supply voltages having such magnitudes as to correspond to counts of input pulse (or numbers of engine rotation) and therefore supply low voltage when the number of engine rotation is small but increase output voltage as the number of engine rotation is progressively increased. To the frequency-voltage converter circuit 2 is arranged a means or volume 3, for example, to preset the number of engine rotation when the clutch is to be connected. Converting ratio in the frequency-voltage converter circuit 2 can be therefore varied by the operation of volume 3. In addition, the frequency-voltage converter circuit 2 is arranged to supply a certain low voltage enough to drive a servomotor even if input frequency, that is, the number of engine rotation is zero.

Numeral 9 denotes a switching means for increasing and decreasing voltage applied from the frequency-voltage converter circuit 2 using voltage drop due to a resistor 91. Said switching means 9 also includes a normally closed type switch 92 connected parallel to the resistor 91 which is arranged on a voltage supply line 8. The switch 92 is turned on and off by manually operating a push button arranged to a shift lever, for example, to thereby increase and decrease voltage supplied to a servomotor mechanism 4 using voltage drop due to the resistor 91 so as to positively and reversely rotate the servomotor.

The servomotor mechanism 4 is attached to a car body 10 and forwardly and reversely rotates the servomotor depending upon increase and decrease of voltage applied from the frequency-voltage converter circuit 2, to thereby operate a clutch pedal 6 operatively coupled to clutch 20. Numeral 5 represents a movable arm attached to the rotating shaft of servomotor and numeral 7 a rod for connecting the movable arm 5 to the clutch pedal 6.

The servomotor mechanism 4 uses a certain voltage as its reference voltage and positively rotates the servomotor to return the clutch pedal to its original position rendering the clutch disconnected when voltage supplied is lower than reference voltage while reversely rotates the servomotor to put the clutch pedal to its operational position rendering the clutch connected.

Numeral 11 represents a limit switch attached to the back side of clutch pedal and said limit switch 11 serves to disconnect the voltage supply line 8 when a foot of driver or other material is caught between the clutch pedal 6 and a floor 14 and enables the system of the present invention to be used in safety.

The present invention provides an automatic control system for operating the clutch of car and having such arrangement as described above. Accordingly, when the switch 92 is operated, voltage supplied to the servomotor mechanism 4 is immediately reduced following voltage drop due to the resistor 91 so that the servomotor is reversely rotated to drive the clutch pedal 6 in the direction in which the clutch is disconnected. Gear change can be therefore attained only by operating the switch 92 and shift lever without any troublesome operation of clutch pedal which was conventionally required every gear change. Particularly when the present invention is directed to this use, it is quite desirable that the push button for operating the switch 92 is arranged on the shift lever for the convenience of operating the switch 92.

Figure 2:
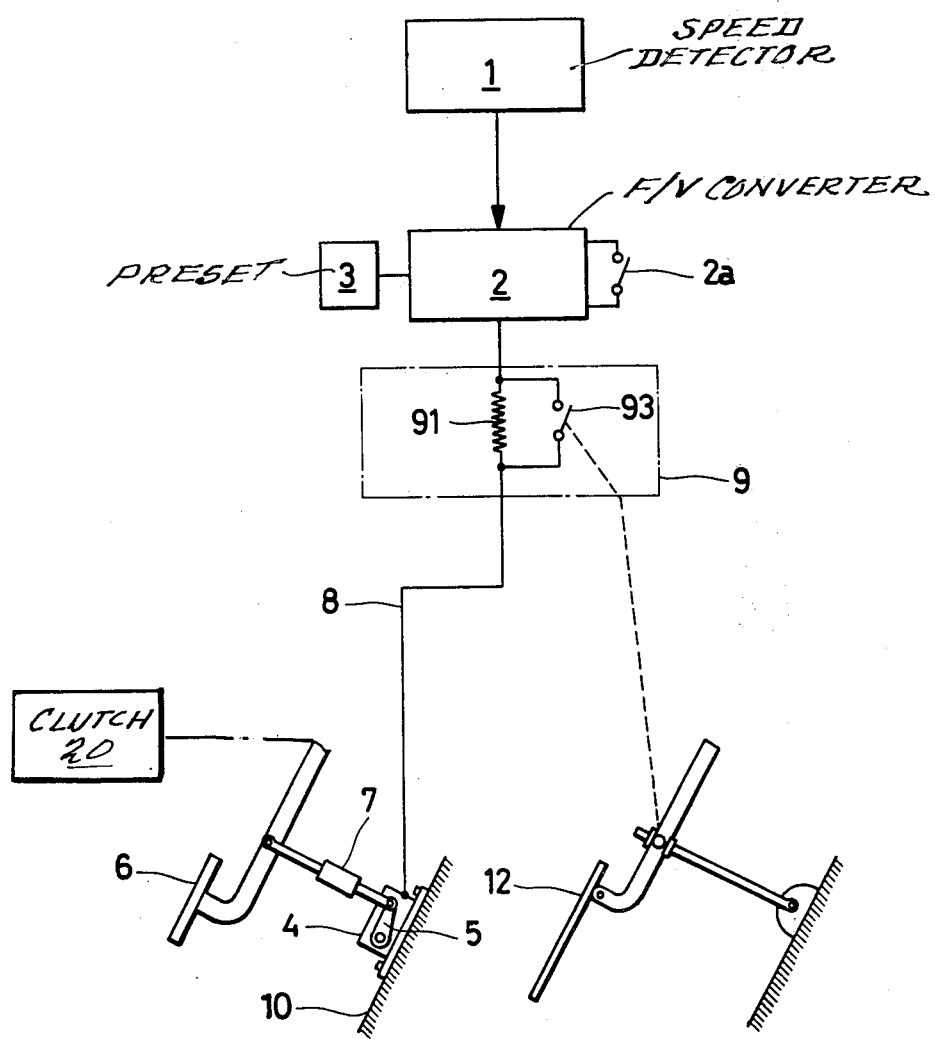
FIG. 2 schematically shows the basic construction of a second embodiment according to the present invention.

FIG. 2 shows a second embodiment of the present invention in which, instead of manually operating switching means, a switch 93 connected parallel to the resistor 91 is turned on and off following the operation of an accelerating pedal 12 to render the clutch pedal 6 operated.

When the car is under stopped condition, no current is supplied to the servomotor mechanism 4 and the clutch pedal 6 is returned by spring force leaving the clutch connected. The gear is brought into neutral position by operating the shift lever. After selecting by the volume 3 the rotation number of engine (1200 rotations, for example) when the clutch is to be connected and setting the converting ratio of frequency-voltage converter circuit 2, the engine is started and a switch 2a in the frequency-voltage converter circuit 2 is turned on. The frequency-voltage converter circuit 2 is adapted to supply a certain low voltage even if the rotation number of engine, that is, input frequency is zero. Therefore, such low voltage is applied to the servomotor mechanism 4 and the movable arm 5 attached to the rotating shaft of servomotor in the servomotor mechanism 4 is rotated to draw the clutch pedal 6 via the connecting rod 7 so as to disconnect the clutch immediately. As the accelerating pedal 11 is progressively pressed after the gear is put into low position by the shift lever, the switch 92 is turned on and the rotation number of engine is increased to progressively increase output voltage supplied from the frequency-voltage converter circuit 2. Therefore, the movable arm 5 is reversely rotated to bring the clutch pedal 6 to its operational position. When the rotation number of engine reaches 1200 previously selected, the output voltage of frequency-voltage converter circuit 2 also reaches a predetermined value (12 V, for example) and the clutch pedal 6 is brought to a position at which the clutch is completely connected, so that the car starts to run.

When gear change is further intended in the car starting to run, force pressing the accelerating pedal 12 is lightened. The switch 93 is then turned off causing output of frequency-voltage converter circuit 2 to flow through the resistor 91. Drop in voltage is thus generated through the resistor 91. Although the rotation number of engine is kept large and output voltage of frequency-voltage converter circuit 2 high accordingly, voltage applied to the servomotor mechanism 4 is quickly reduced and the movable arm 5 is rotated to draw the clutch pedal 6 in the direction in which the clutch is disconnected. Gear change can be therefore carried out with the clutch disconnected.

When the rotation number of engine is changed by the volume 3 from 1200 rotations to 1500 rotations, the converting ratio of frequency-voltage converter circuit 2 is also changed. Namely, when the rotation number of engine reaches 1500, predetermined voltage of 12 V is supplied to bring the clutch into connection. The rotation number of engine at which the clutch is to be connected can be therefore adjusted to any desired one.

According to the second embodiment of the present invention, the operation of accelerating pedal is associated with that of clutch pedal and when the accelerating pedal is released from pressing force, voltage drop due to the resistor 91 causes voltage supplied to the servomotor mechanism 4 to be reduced to render the clutch disconnected. When the accelerating pedal is pressed, short is caused between both terminals of resistor 91 and high voltage corresponding to the pressing force of accelerating pedal is supplied to the servomotor mechanism 4 to keep the clutch connected. Gear changes can be therefore achieved only by releasing the accelerating pedal from pressing force and operating the shift lever.

Figure 3:
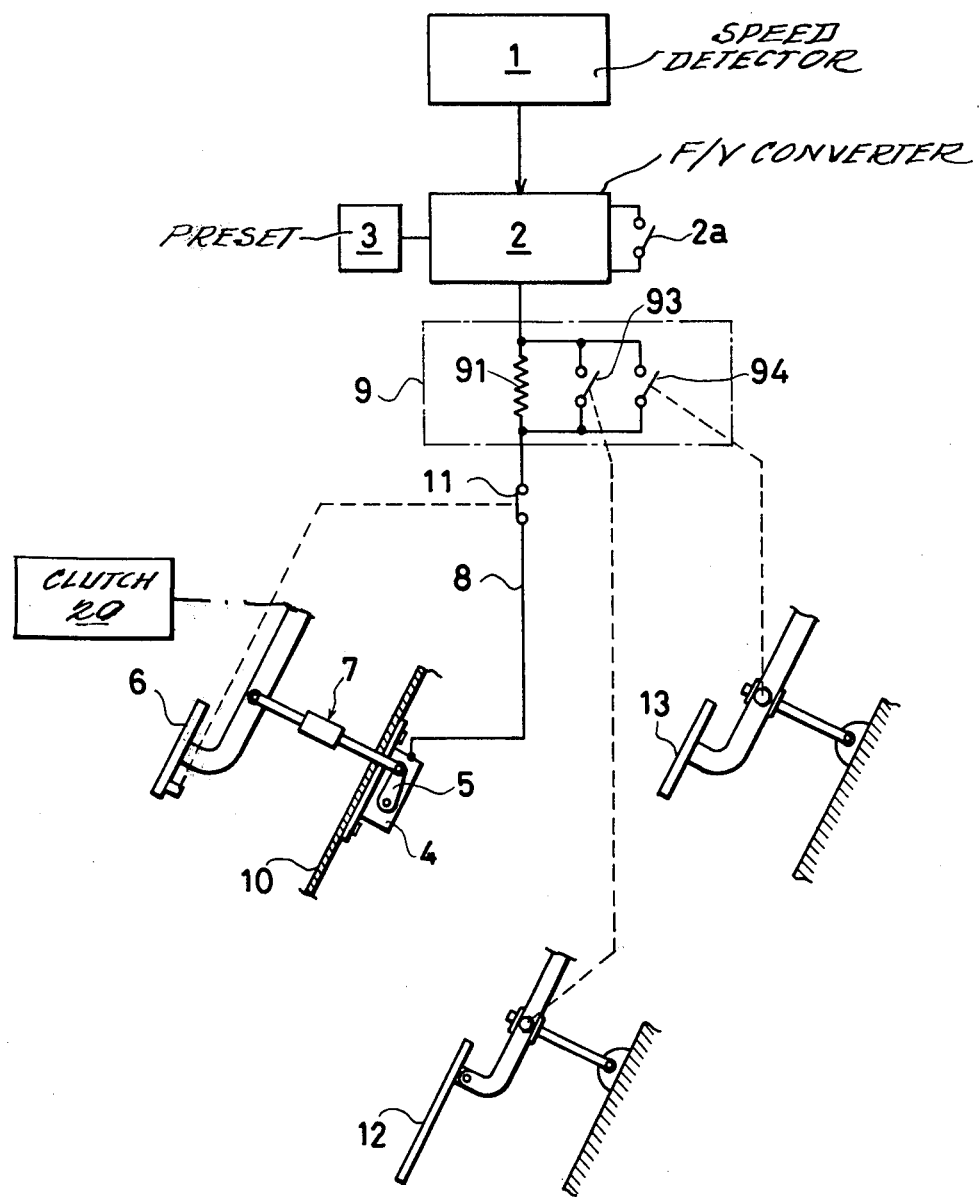
FIG. 3 schematically shows the basic construction of a third embodiment according to the present invention.

FIG. 3 shows a third embodiment of the present invention in which clutch operation is associated with the operation of brake pedal so as not to render the clutch disconnected when braking operation is attempted in the running car. Numeral 94 represents a switch connected parallel to the switch 93 which is operated by the accelerating pedal 12, and said switch 94 is turned on and off by operating a brake pedal 13. The switch 94 similar to the switch 93 and operated by the brake pedal 13 causes a short between both terminals of resistor 91 to supply to the servomotor mechanism 4 high voltage corresponding to the rotation number of engine so as to render the clutch connected while causes voltage drop through the resistor 91 to supply low voltage to the servomotor mechanism 4.

When the present invention is intended to this mode of use, the clutch is kept connected even if the driver puts his foot off from the accelerating pedal 12 and thus turns the switch 93 off to brake his running car, because the switch 94 can be closed by the operation of brake pedal 13. Therefore, both of engine and foot brakes are actuated by the operation of brake pedal 13 to brake the running car while reduce the rotation number of engine. As the brake pedal 13 is progressively pressed, the speed of running car is reduced and when the rotation number of engine becomes smaller than 1200, output of frequency-voltage converter circuit 2 is lowered and voltage applied to the servomotor 4 is reduced causing the clutch to be disconnected. Thereafter, only the foot brake is effective in operation and it will be therefore understood that the third embodiment of the present invention is desirable from the viewpoint of safety.

Figure 4:
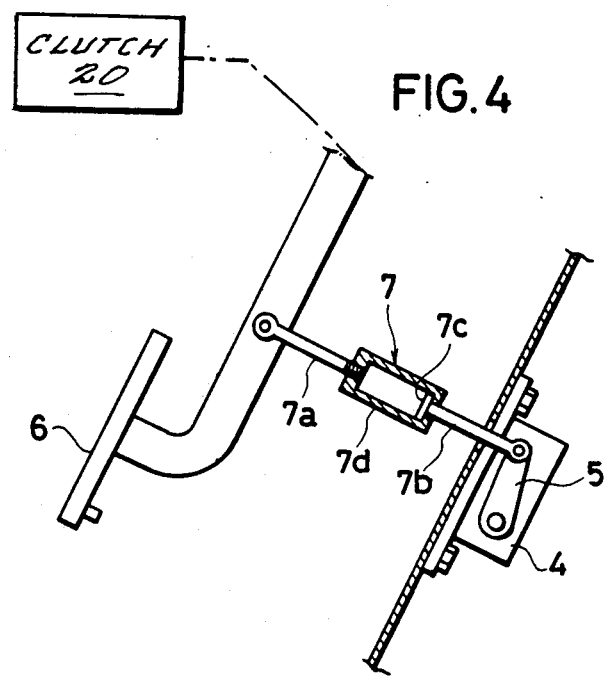
FIG. 4 is a sectional view showing main parts of a section for connecting a clutch pedal and a servomotor mechanism.

According to the present invention, the circuit shown in FIG. 1 is not put into operation unless the switch 2a of frequency voltage converter circuit 2 is turned on, and it is therefore certain that the clutch can be still be operated by the foot of the driver. In the case where the clutch is to be operated by the foot press of the driver, the connecting rod 7 between the clutch pedal 6 and the movable arm 5 is divided to two parts and a cylinder 7d is fixed to a rod 7a connected to the clutch pedal 6 while a collar 7c is attached to the foremost end of a rod 7b which is inserted like a piston rod into the cylinder 7d, as shown in FIG. 4. When the clutch pedal 6 is pressed by the foot of the driver, a predetermined amount of depression is absorbed by the cylinder section and not transmitted to the movable arm 5. Therefore, the car to which the system of the present invention is attached can be still used as manual car.

In the case where the system of the present invention is attached to a Diesel engine car, rotation numbers of engine may be determined from some appropriate means other than the ignition circuit and converted to pulses.

As apparent from the above, the operation of clutch pedal to connect and disconnect the clutch is controlled associating with the operation of accelerating pedal in the second embodiment unless the power switch for the system of the present invention is turned off. It is therefore more desirable for the convenience of operation that a control or stop switch is arranged on the head of shift lever. Particularly when an emergency stop button is arranged on the head of shift lever, it is quite advantageous for the driver to meet the case where his foot is caught between the clutch pedal and the floor.

As described above, the present invention enables a car to have automatic clutch function similar to that of automatic car, that is, the operation of clutch to be automatically achieved by the manual or foot operation of switching means, thus making it unnecessary for the driver to operate the clutch pedal at the time of car start and gear changes. In addition, automatic clutch operation according to the present invention is attained by directly operating the clutch pedal and the system of the present invention can be therefore easily attached to manual cars.

Further, when the converting ratio for converting frequency to voltage in the frequency-voltage converter circuit 2 is variable as described on embodiments of the present invention, it is also possible for the driver to set the rotation number of engine to his desired one by adjusting the converting ratio at the time when the clutch is to be connected.

What is claimed is:

1. An control system for automatically operating the clutch pedal of a car and capable of being attached to cars of manual shift transmission type comprising:
    servomotor means, adapted to be coupled to said clutch pedal and rotated forwardly and reversely, depending upon an increase and decrease of a control voltage, for driving said clutch pedal in directions in which a clutch is connected and disconnected;
    circuit means for generating pulses related to the speed of an engine in said car;
    frequency-voltage converting means for generating said control voltage related to said pulses;
    a resistor connected between said frequency-voltage converting means and said servomotor means;
    first switching means, connected in parallel with said resistor, for shorting said resistor when an accelerator pedal of said car is in a predetermined position; and
    second switching means, connected in parallel with said resistor, for shorting said resistor when a brake pedal of said car is in a predetermined position.

2. An automatic control system for operating said clutch pedal of said car according to claim 1 further comprising:
    limit switch means arranged on a back side of said clutch pedal for generating an obstruction signal when an obstruction is caught behind said clutch pedal; and
    third switching means, connected in series with said resistor between said converting means and said servomotor means and responsive to said obstruction signal for interrupting said control voltage supplied to said servomotor means to stop the operation of said clutch pedal when an obstruction is caught behind said clutch pedal.

3. An automatic control system for operating said clutch pedal of said car according to claim 1 further comprising means for presetting a frequency-to-voltage converting ratio in said frequency-voltage converting means to select an engine speed at which said clutch is to be connected.

* * * * *